United States Patent
Chih-Min et al.

(10) Patent No.: US 7,400,516 B2
(45) Date of Patent: Jul. 15, 2008

(54) APPARATUS FOR SUPPORTING A PLURALITY OF CARDS IN AN INFORMATION HANDLING SYSTEM

(75) Inventors: Su Chih-Min, Sanchong (TW); Chen Yu-Lin, Banciao (TW); Pan Chien-Hua, Shang-Da Village, Guan-Yin Township (TW); Pan Chien-Chou, Zhong-Li (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/454,210

(22) Filed: Jun. 16, 2006

(65) Prior Publication Data

US 2007/0291461 A1 Dec. 20, 2007

(51) Int. Cl.
*H05K 7/02* (2006.01)
(52) U.S. Cl. ...................................... 361/807
(58) Field of Classification Search ................. 361/807, 361/796, 801, 755, 683–684, 785, 787; 439/157, 439/160
See application file for complete search history.

(56) References Cited

U.S. PATENT DOCUMENTS

| 5,980,282 | A | * | 11/1999 | Cheng | ........................ 439/157 |
| 6,256,191 | B1 | * | 7/2001 | Curlee | ........................ 361/683 |
| 6,396,685 | B1 | | 5/2002 | Chien | |
| 6,764,330 | B1 | | 7/2004 | Chen | |
| 6,970,363 | B2 | | 11/2005 | Bassett et al. | |

* cited by examiner

*Primary Examiner*—J. F. Duverne
(74) *Attorney, Agent, or Firm*—Haynes and Boone, LLP

(57) ABSTRACT

A card supporting apparatus includes a base member. A first securing member is moveably coupled to the base member, wherein the first securing member includes a first card engagement feature located a first height above the base member. A second securing member is moveably coupled to the base member, wherein the second securing member includes a second card engagement feature located a second height above the base member, whereby the second height is different from the first height. The base member may be coupled to an information handling system chassis that includes a plurality of cards located in a spaced apart relationship to each other. The first securing member and the second securing member may then be used to support the cards in order to restrict movement of the cards.

14 Claims, 12 Drawing Sheets

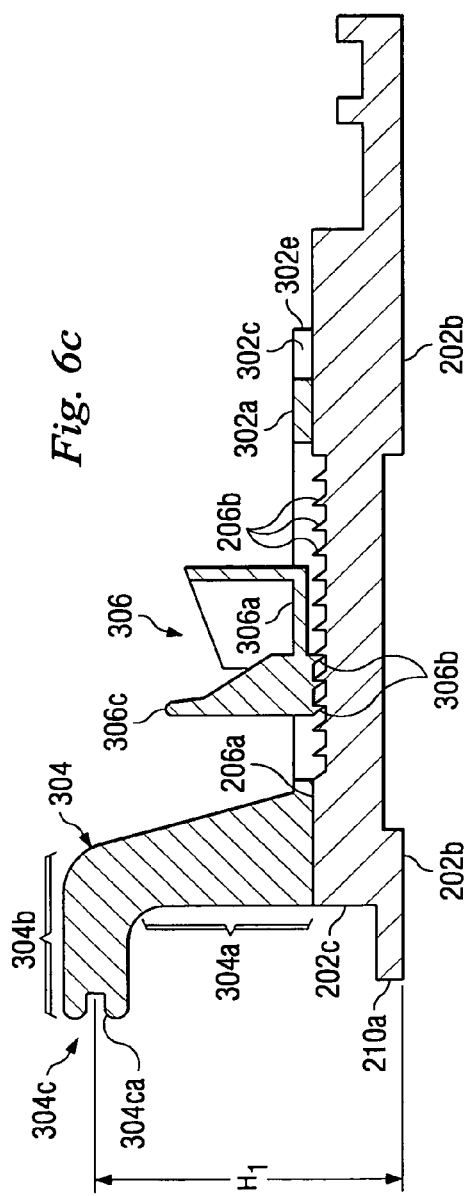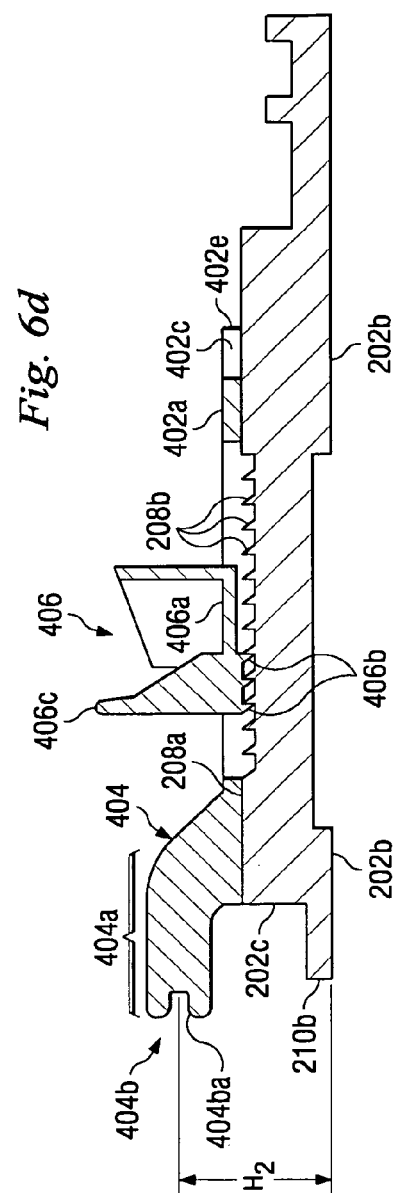

APPARATUS FOR SUPPORTING A PLURALITY OF CARDS IN AN INFORMATION HANDLING SYSTEM

BACKGROUND

The present disclosure relates generally to information handling systems, and more particularly to supporting a plurality of cards in an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs include a plurality of cards coupled to an IHS chassis and extending from the IHS chassis adjacent each other and into an IHS housing. Because of the desire to reduce the size of the IHS chassis, the supporting of these cards raises a number of issues.

Reducing the size of the IHS chassis reduces the size of the IHS housing in which the cards are located. As the size of the IHS housing is reduced, the cards must be located closer to each other and to the walls of the IHS chassis that define the IHS housing. During shock and vibration of the IHS chassis, the cards can deflect and come into contact with each other and/or the chassis walls on the IHS chassis that defined the IHS housing, which can result in damage to and/or failure of the cards.

Accordingly, it would be desirable to provide for supporting a plurality of cards in an IHS absent the disadvantages found in the prior methods discussed above.

SUMMARY

According to one embodiment, a card supporting apparatus includes a base member, a first securing member moveably coupled to the base member, wherein the first securing member comprises a first card engagement feature located a first height above the base member, and a second securing member moveably coupled to the base member, wherein the second securing member comprises a second card engagement feature located a second height above the base member, whereby the second height is different from the first height.

BRIEF DESCRIPTION OF THE DRAWINGS

FIG. 3b is a cross sectional view illustrating an embodiment of the first securing member of FIG. 3a.

FIG. 4b is a cross sectional view illustrating an embodiment of the second securing member of FIG. 4a.

FIG. 6c is a cross sectional view illustrating an embodiment of the first securing member of FIGS. 3a and 3b coupled to the base member of FIG. 2.

FIG. 6d is a cross sectional view illustrating an embodiment of the second securing member of FIGS. 4a and 4b coupled to the base member of FIG. 2.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
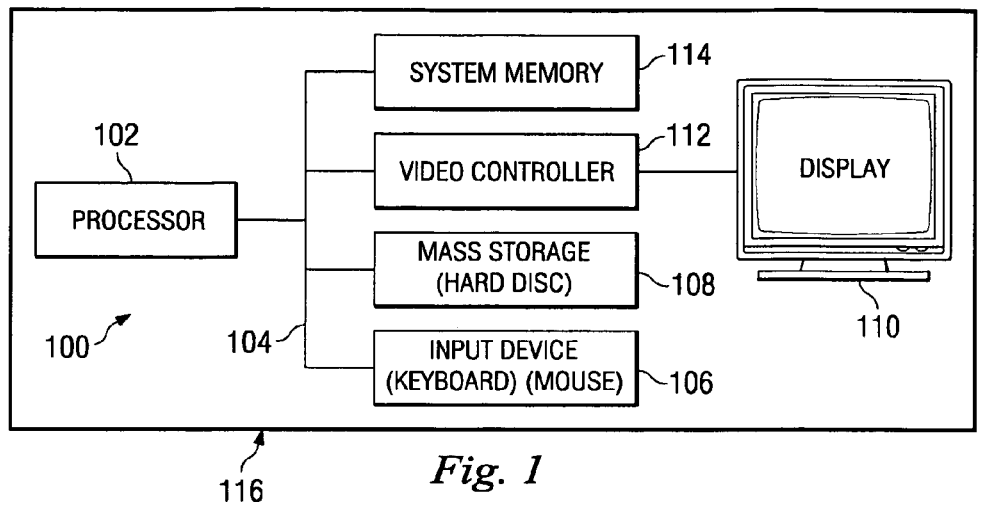
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of computer system 100. An input device 106 is coupled to processor 102 to provide input to processor 102. Examples of input devices include keyboards, touchscreens, and pointing devices such as mouses, trackballs and trackpads. Programs and data are stored on a mass storage device 108, which is coupled to processor 102. Mass storage devices include such devices as hard disks, optical disks, magneto-optical drives, floppy drives and the like. IHS 100 further includes a display 110, which is coupled to processor 102 by a video controller 112. A system memory 114 is coupled to processor 102 to provide the processor with fast storage to facilitate execution of computer programs by processor 102. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
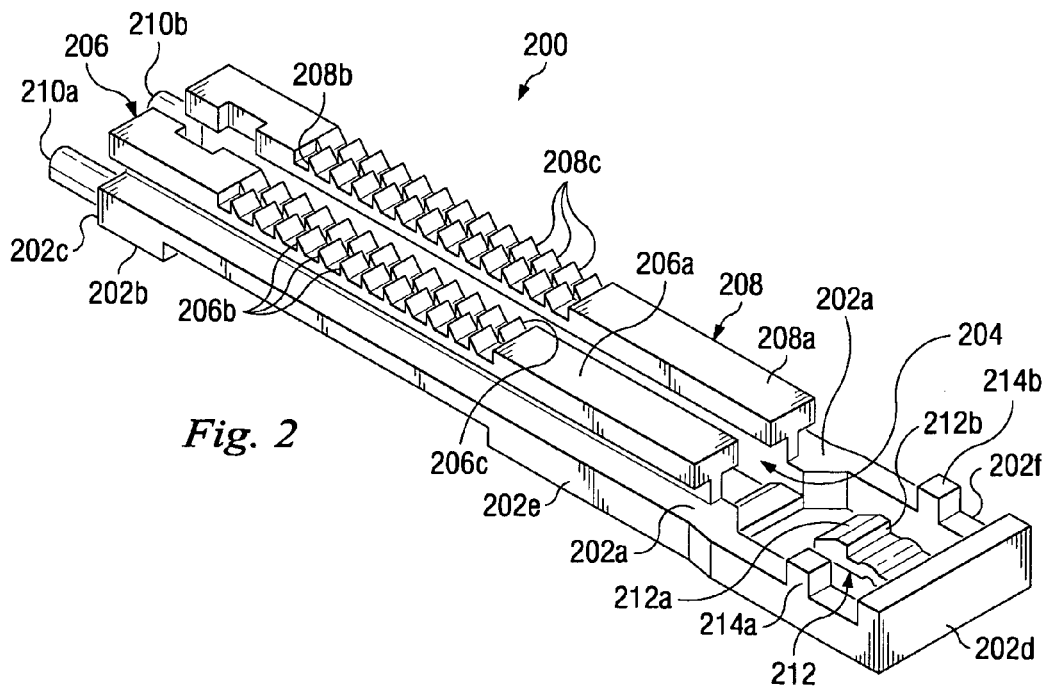
FIG. 2 is perspective view illustrating an embodiment of a base member.

Referring now to FIG. 2, a base member 200 is illustrated. The base member 200 includes a top surface 202a, a bottom surface 202b located opposite the top surface 202a, a front surface 202c extending between the top surface 202a and the bottom surface 202b, a rear wall 202d located opposite the front surface 202c and extending between the top surface 202a and the bottom surface 202b, and a pair of opposing side surfaces 202e and 202f each extending between the top surface 202a, the bottom surface 202b, the front surface 202c, and the rear wall 202d. A channel 204 is defined by the base member 200 and centrally located on the base member 200 between the side surfaces 202e and 202f. A first track 206 extends from the top surface 202a of the base member 200, is located adjacent the side surface 202e, and includes a substantially T-shaped cross section with a top surface 206a. A plurality of teeth 206b and 206c are located on the top surface 206a of the first track 206. In an embodiment, the plurality of teeth 206b are equally spaced from each other and the plurality of teeth 206c are equally spaced from each other, with the position of the teeth 206b shifted with respect to the teeth 206c. In an embodiment, the teeth 206b are shifted from the teeth 206c by approximately 0.5 mm. A second track 208 extends from the top surface 202a of the base member 200, is located adjacent the side surface 202f and opposite the channel 204 from the first track 206, and includes a substantially T-shaped cross section with a top surface 208a. A plurality of teeth 208b and 208c are located on the top surface 208a of the second track 208. In an embodiment, the plurality of teeth 208b are equally spaced from each other and the plurality of teeth 208c are equally spaced from each other, with the position of the teeth 208b shifted with respect to the teeth 208c. In an embodiment, the teeth 208b are shifted from the teeth 208c by approximately 0.5 mm. A locating member 210a extends from the front surface 202c of the base member 200 and is located adjacent the side surface 202e. A locating member 210b extends from the front surface 202c of the base member 200 and is located adjacent the side surface 202f and opposite the channel 204 from the locating member 210a. A chassis securing member 212 extends from the rear wall 202d and into the channel 204 between the side surfaces 202e and 202f. The chassis securing member 212 includes a beveled securing end 212a and a securing surface 212b adjacent the beveled securing end 212a. In an embodiment, the locating members 210a and 210b and the chassis securing member 212 comprise a chassis coupling feature on the base member 200. A pair of stop members 214a and 214b extend from the top surface 202a of the base member 200, adjacent the side surfaces 202e and 202f, respectively, and on either side of the chassis securing member 212.

Figure 3A:
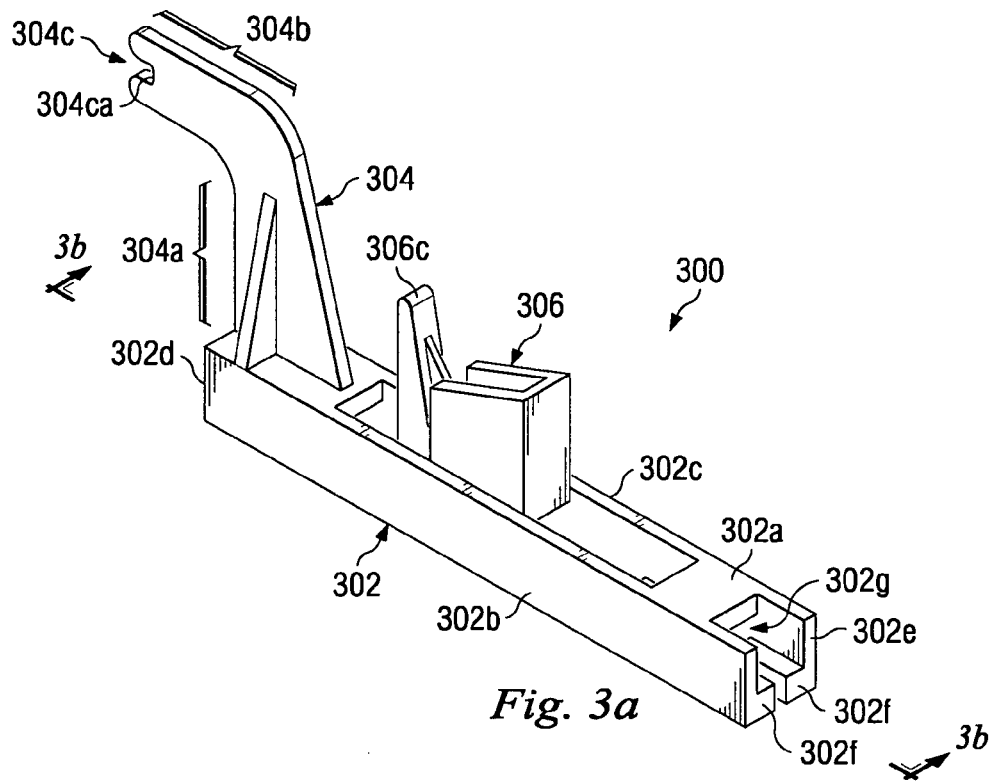
FIG. 3a is a perspective view illustrating an embodiment of a first securing member used with the base member of FIG. 2.
Figure 3B:
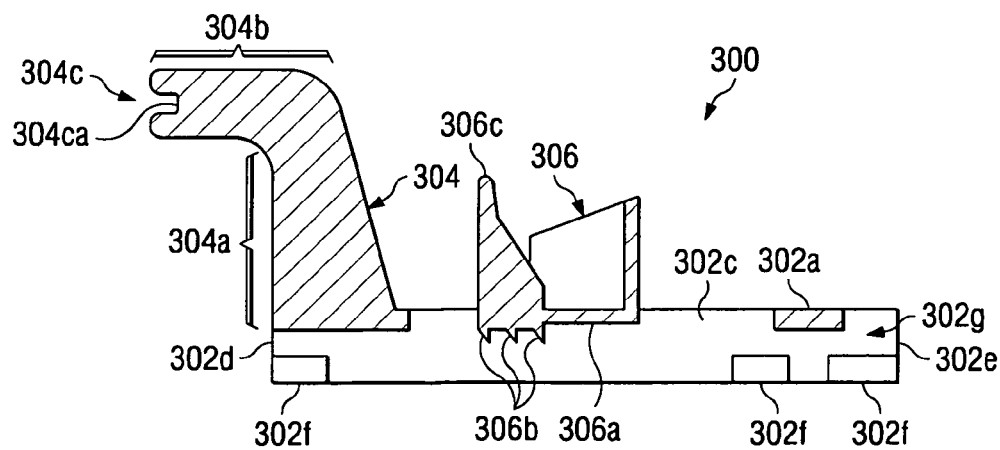

Referring to FIGS. 3a and 3b, a first securing member 300 is illustrated. The first securing member 300 includes a base 302 having a top wall 302a, a pair of opposing side walls 302b and 302c extending from the top wall 302a, a front surface 302d extending between the top wall 302a and the side walls 302b and 302c, a rear surface 302e located opposite the front surface 302d and extending between the top wall 302a and the side walls 302b and 302c, and a plurality of bottom walls 302f extending from the side walls 302b and 302c. A coupling channel 302g is defined by the base 302 along the length of the base 302 and located between the top wall 302a, the side walls 302b and 302c, and the bottom walls 302f. A securing arm 304 extends from the top wall 302a of the base 302 and includes a first portion 304a extending substantially perpendicularly with respect to the top surface 302a of the base 302, a second portion 304b extending substantially perpendicularly from the first portion 304a, and a first card engagement feature 304c located on a distal end of the second portion 304b of the securing arm 304 which, in an embodiment, is a engagement channel 304ca defined by the second portion 304b of the securing arm 304. A locking member 306 extends between the side walls 302b and 302c and includes a beam 306a that is resiliently coupled to the locking member 306. A plurality of teeth 306b are located on a distal end of the beam 306a and a handle 306c extends perpendicularly from the distal end of the beam 306a.

Figure 4A:
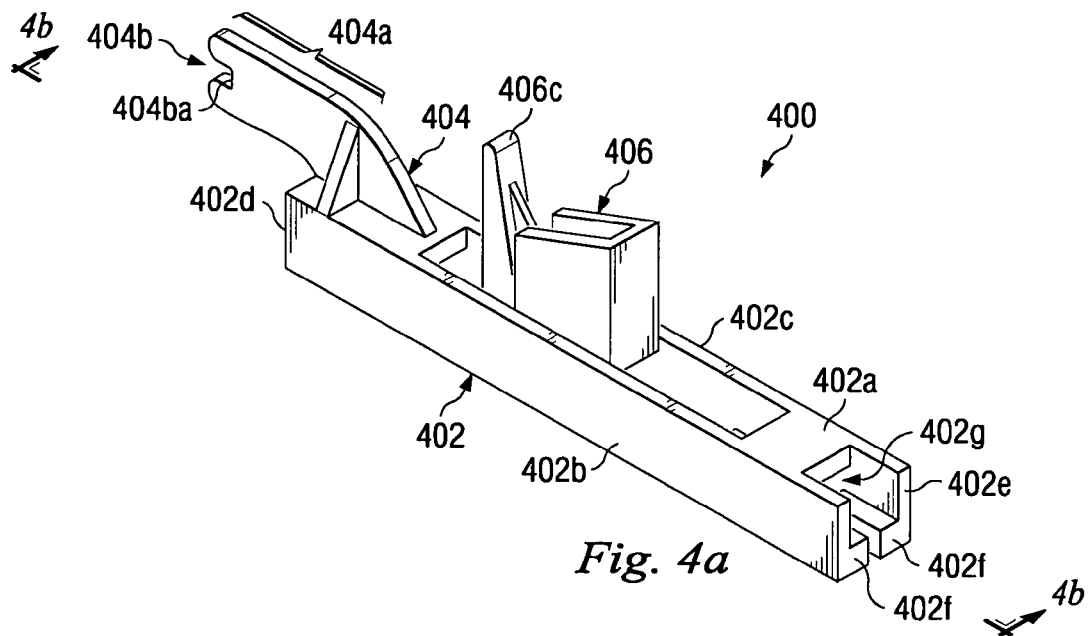
FIG. 4a is a perspective view illustrating an embodiment of a second securing member used with the base member of FIG. 2.
Figure 4B:
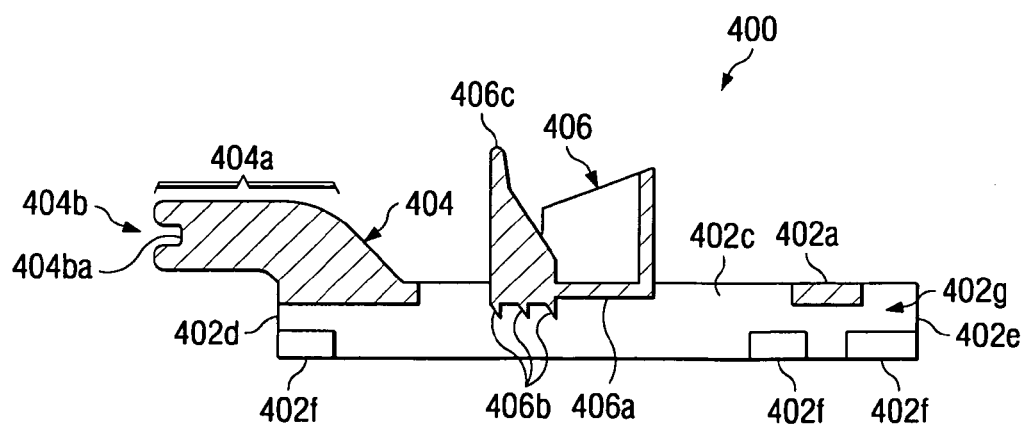

Referring to FIGS. 4a and 4b, a second securing member 400 is illustrated. The second securing member 400 includes a base 402 having a top wall 402a, a pair of opposing side walls 402b and 402c extending from the top wall 402a, a front surface 402d extending between the top wall 402a and the side walls 402b and 402c, a rear surface 402e located opposite the front surface 402d and extending between the top wall 402a and the side walls 402b and 402c, and a plurality of bottom walls 402f extending from the side walls 402b and 402c. A coupling channel 402g is defined by the base 402 along the length of the base 402 and located between the top wall 402a, the side walls 402b and 402c, and the bottom walls 402f. A securing arm 404 extends from the top wall 402a of the base 402 and includes a first portion 404a extending substantially parallel with respect to the top surface 402a of the base 402 and a second card engagement feature 404b located on a distal end of the first portion 404a of the securing arm 404 which, in an embodiment, is a engagement channel 404ba defined by the first portion 404a of the securing arm 404. A locking member 406 extends between the side walls 402b and 402c and includes a beam 406a that is resiliently coupled to the locking member 406. A plurality of teeth 406b are located on a distal end of the beam 406a and a handle 406c extends perpendicularly from the distal end of the beam 406a.

Figure 5:
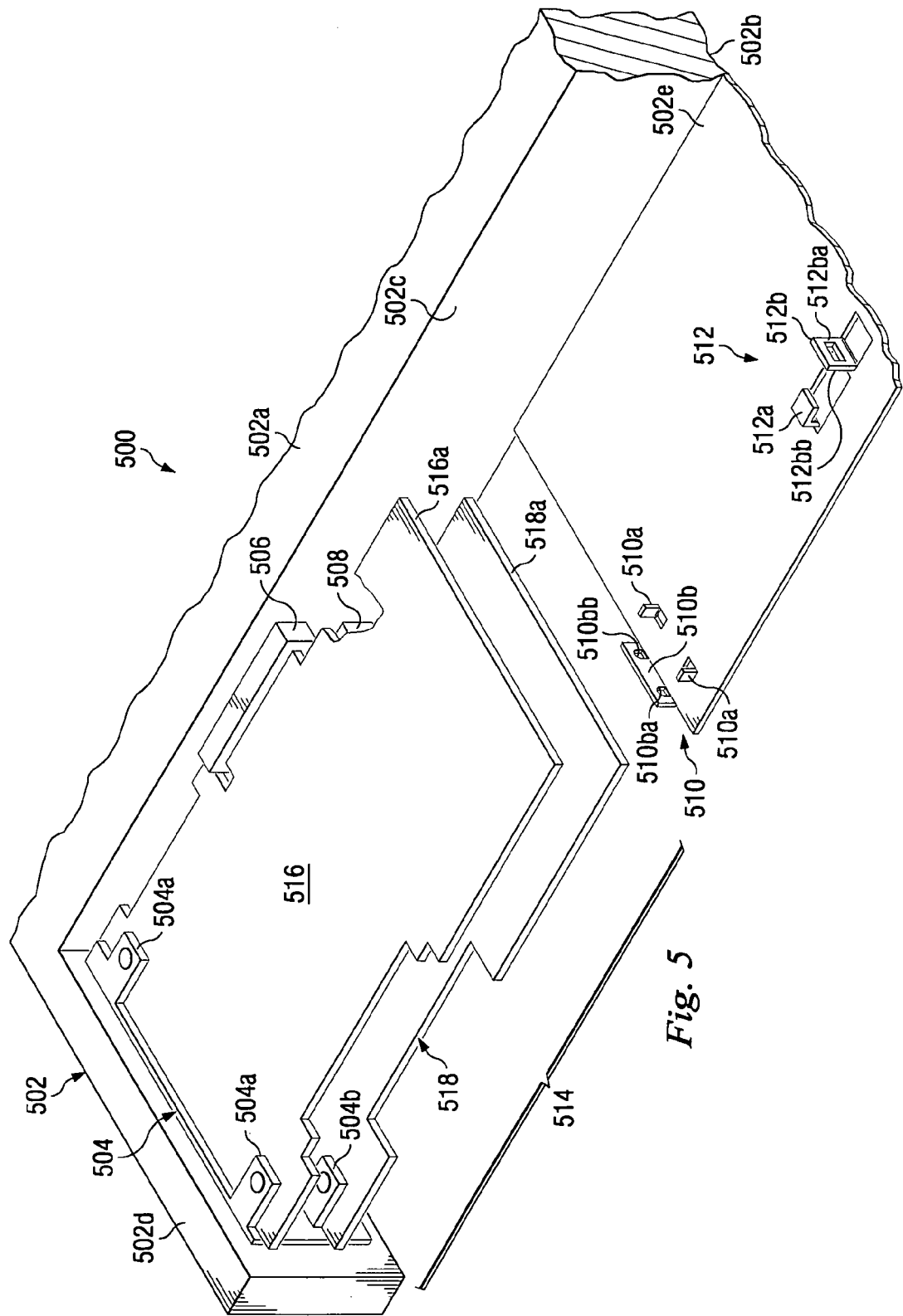
FIG. 5 is a perspective view illustrating an embodiment of an IHS chassis used with the base member of FIG. 2, the first securing member of FIGS. 3a and 3b, and the second securing member of FIGS. 4a and 4b.

Referring now to FIG. 5, an IHS chassis 500 is illustrated. In an embodiment, the chassis 500 may be, for example, the chassis 116, described above with reference to FIG. 1, and may house some or all of the IHS components of the IHS 100, described above with reference to FIG. 1. The IHS chassis 500 includes a base 502 including a top surface 502a, a bottom surface 502b located opposite the top surface 502a, a connector surface 502c extending between the top surface 502a and the bottom surface 502b, a support wall 502d extending from the connector surface 502c and between the top surface 502a and the bottom surface 502b adjacent an edge of the base 502, and a securing member support surface 502e extending from the connector surface 502c and adjacent the bottom surface 502b. A bracket 504 is mounted to the support wall 502d and includes a plurality of first card supports 504a and a plurality of second card supports 504b located in a spaced apart relationship and extending from the bracket 504. A first card connector 506 extends from the connector surface 502c and a second card connector 508 extends from the connector surface 502c and is located adjacent the first card connector 506. In an embodiment, the first card connector 506 and the first card supports 504a provide a first card coupling feature. In an embodiment, the second card connector 508 and the second card supports 504b provide a second card coupling feature. In an embodiment, the first card connector 506 and the second card connector 508 are electrically coupled to a processor (not shown) such as, for example, the processor 102 described above with reference to FIG. 1. A securing member locator 510 is located on the securing member support surface 502e and includes a pair of spaced apart guide members 510a extending perpendicularly from the securing member support surface 502e and a locating member 510b extending perpendicularly from the securing member support surface 502e and defining a pair of locating apertures 510ba and 510bb in a spaced apart orientation along its length. A securing member coupler 512 is located on the securing member support surface 502e and includes a guide 512a extending from the securing member support surface 502e and a securing beam 512b extending from the securing member support surface 502e in a spaced apart relationship from the guide 512a and defining a coupling aperture 512ba and a securing surface 512bb located adjacent the coupling aperture 512ba. A card housing 514 is defined in the IHS chassis 500 and between the bracket 504, the connectors 506 and 508, and the securing member support surface 502e. A first card 516 is located in the card housing 514 and coupled to the first card connector 506 and the first card supports 504a on the bracket 504 such that a distal end 516a of the first card 516 is located adjacent the securing member support surface 502e. A second card 518 is located in the card housing 514 and coupled to the second card connector 508 and the second card supports 504b on the bracket 504 such that a distal end 518a of the second card 518 is located adjacent the securing member support surface 502e. With the distal ends 516a and 518a unsupported, as illustrated in FIG. 5, during shock and/or vibration of the IHS chassis 500, the distal ends 516a and 518a may deflect such that they engage each other or extend past the top surface 502a and/or the bottom surface 502b of the IHS chassis 500.

Referring now to FIGS. 2, 3a, 3b, 4a, 4b, 5, 6a, 6b, 6c, 6d, 6e, 6f, and 6g 600 for supporting a card in an IHS is illustrated. The method 600 begins at step 602 where a chassis with a first securing member and a second securing member is provided and proceeds to step 604 where a first card and second card are coupled to the chassis. The IHS chassis 500, described above with reference to FIG. 5, is provided. The first card 516 and the second card 518, shown already coupled to the connectors 506 and 508, respectively, on the base 502 may be coupled to the IHS chassis 500 using methods known in the art to engage the first card 516 with the connector 506 and the plurality of first card supports 504a and to engage the second card 518 with the connector 508 and the plurality of second card supports 504b.

Figure 6A:
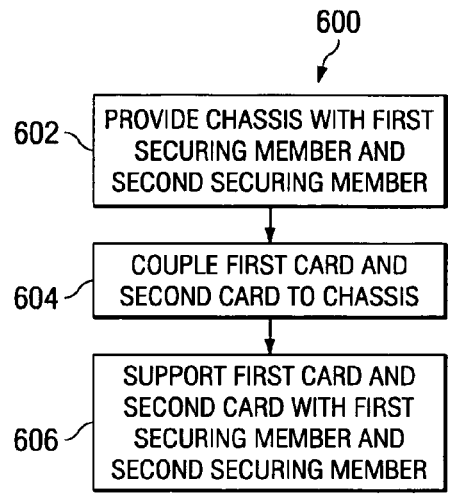
FIG. 6a is a flow chart illustrating an embodiment of a method for supporting a plurality of cards in an IHS.
Figure 6B:
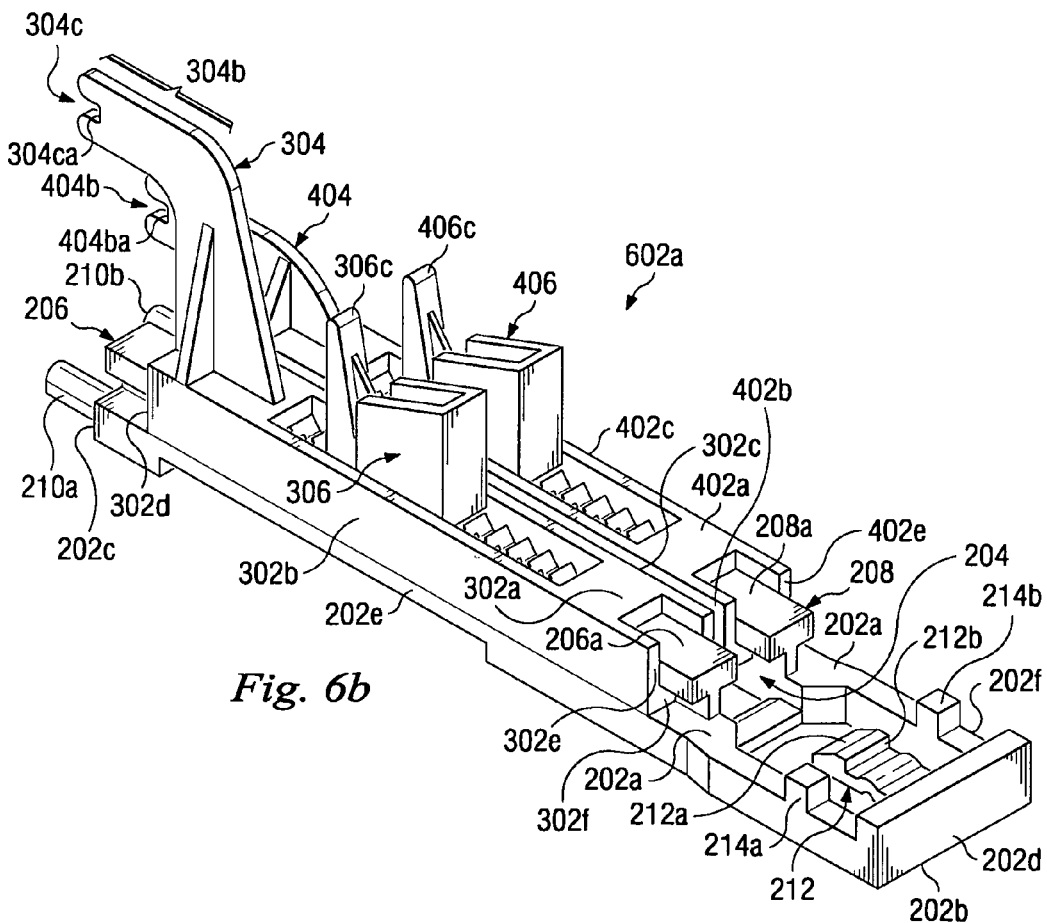
FIG. 6b is a perspective view illustrating an embodiment of the first securing member of FIGS. 3a and 3b and the second securing member of FIGS. 4a and 4b coupled to the base member of FIG. 2.

In an embodiment, the first securing member 300 and the second securing member 400 are provided on the IHS chassis 500 as follows. The first securing member 300 is coupled to the base member 200 by positioning the first track 206 on the base member 200 in the coupling channel 302g defined by the first securing member 300 and the second securing member 400 is coupled to the base member 200 by positioning the second track 208 on the base member 200 in the coupling channel 402g defined by the second securing member 400, providing a card supporting apparatus 602a, as illustrated in FIG. 6b. In an embodiment, the stop surface 214a is operable to prevent the first securing member 300 from decoupling from the first track 206. In an embodiment, the stop surface 214b is operable to prevent the second securing member 400 from decoupling from the second track 208. With the first securing member 300 coupled to the first track 206 on the base member 200, the plurality of teeth 306b on the locking member 306 of the first securing member 300 engage the teeth 206b and 206c on the first track 206 of the base member 200, and the engagement channel 304ca of the first card engagement feature 304c is located a height $H_1$ above the bottom surface 202b of the base member 200, as illustrated in FIG. 6c. With the second securing member 400 coupled to the second track 208 on the base member 200, the plurality of teeth 406b on the locking member 406 of the second securing member 400 engage the teeth 208b and 208c on the second track 208 of the base member 200, and the engagement channel 404ba of the first card engagement feature 404b is located a height $H_2$ above the bottom surface 202b of the base member 200, as illustrated in FIG. 6d. In an embodiment, the height $H_1$ is greater than the height $H_2$. In an embodiment, the heights $H_1$ and $H_2$ may vary depending on the location of the first card 516 and the second card 518 in the IHS chassis 500.

Figure 6E:
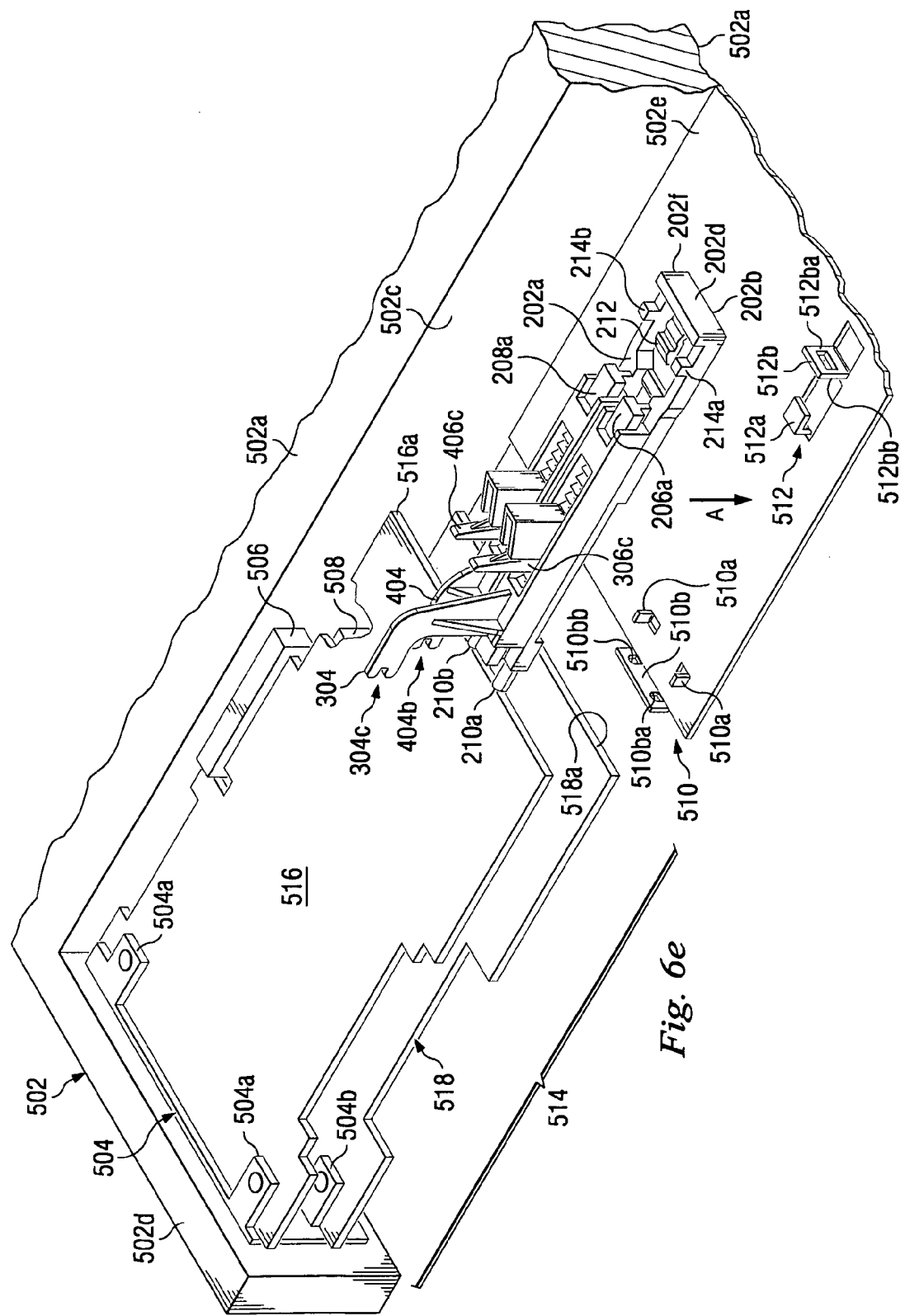
FIG. 6e is a perspective view illustrating an embodiment of the first securing member, the second securing member, and the base member of FIG. 6b being coupled to the IHS chassis of FIG. 5.
Figure 6F:
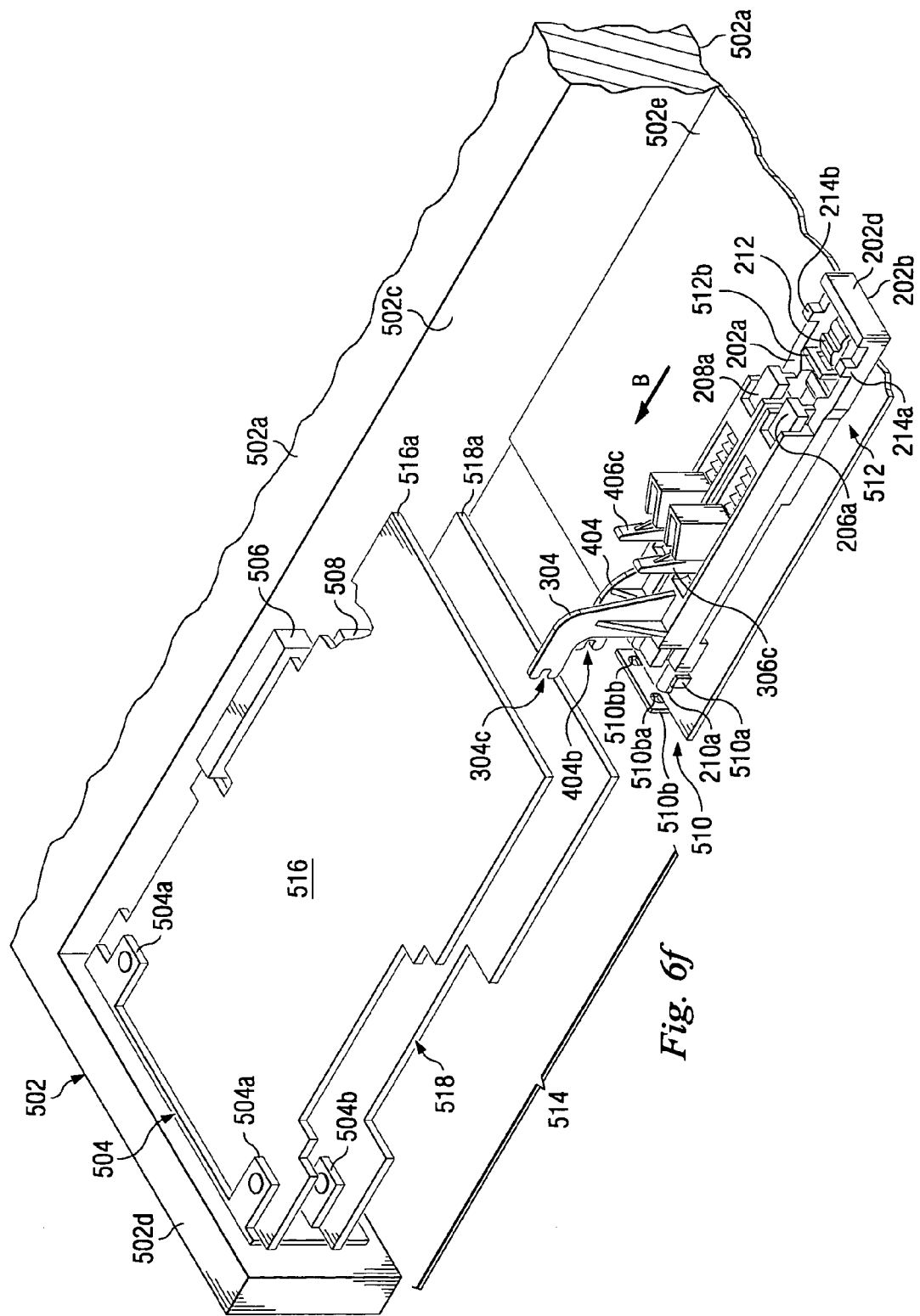
FIG. 6f is a perspective view illustrating an embodiment of the first securing member, the second securing member, and the base member of FIG. 6b being coupled to the IHS chassis of FIG. 5.
Figure 6G:
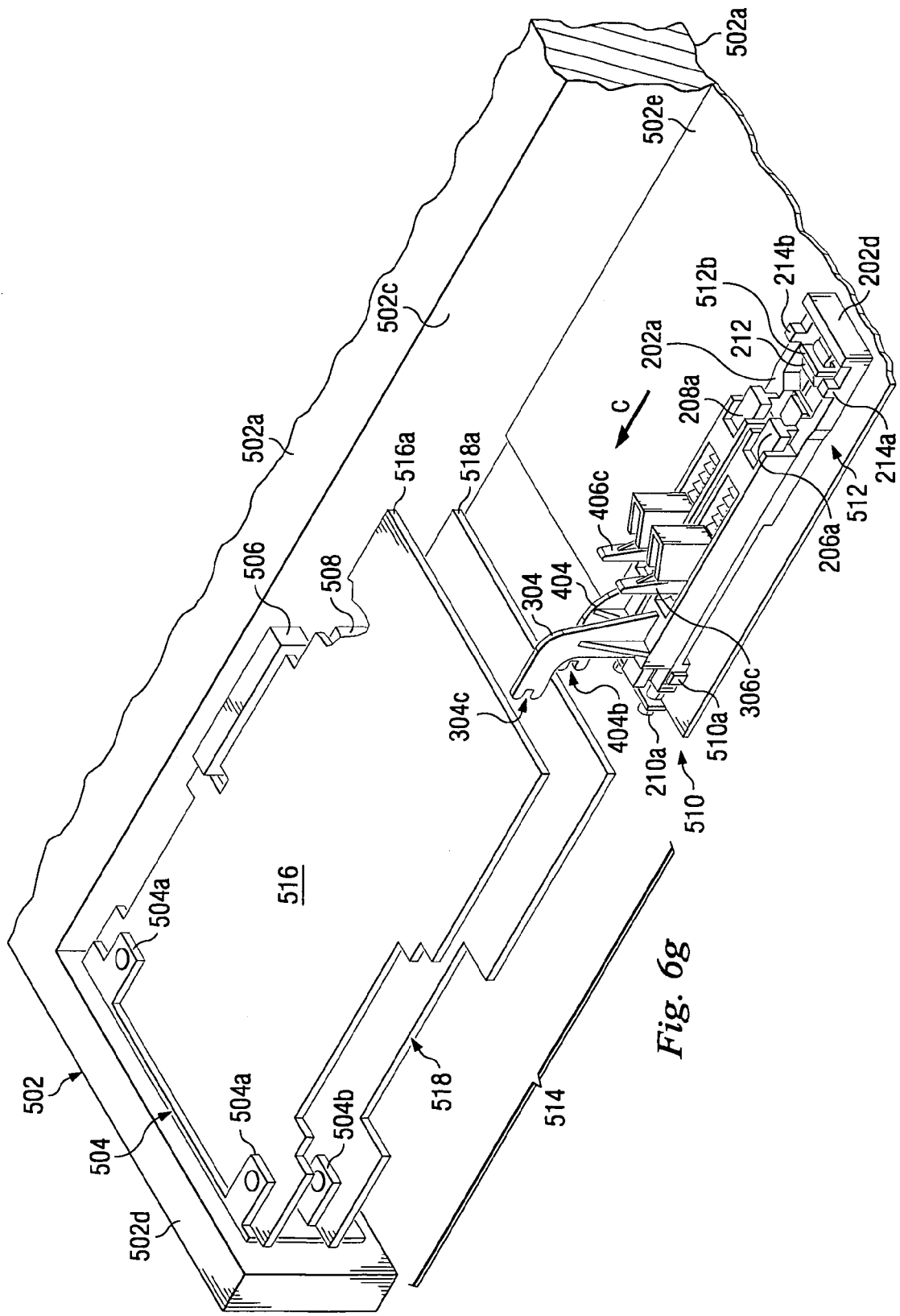
FIG. 6g is a perspective view illustrating an embodiment of the first securing member, the second securing member, and the base member of FIG. 6b coupled to the IHS chassis of FIG. 5.

The card supporting apparatus 602a is then coupled to the IHS chassis 500 by first positioning the card supporting apparatus 602a adjacent the IHS chassis 500 such that the bottom surface 202b of the base member 200 is adjacent the securing member support surface 502e, the locating members 210a and 210b are located adjacent the securing member locator 510, and the chassis securing member 212 is located adjacent the securing member coupler 512, as illustrated in FIG. 6e. The card supporting apparatus 602a is then moved in a direction A towards the securing member support surface 502e such that the bottom surface 202b of the base member 200 engages the securing member support surface 502e, the locating members 210a and 210b are located between the guide members 510a, and the securing beam 512b and guide 512a are located in the channel 204 defined by the base member 200, with the securing beam and adjacent the chassis securing member 212, as illustrated in FIG. 6f. The card supporting apparatus 602a is then moved in a direction B such that the locating members 210a and 210b enter the locating apertures 510ba and 510bb, respectively, defined by the locating member 510b, the sides 202e and 202f of the base member 200 engage the guide members 510a, and the beveled securing end 212a on the chassis securing member 212 enters the coupling aperture 512ba defined by the securing beam 512b such that the chassis securing member 212 deflects and allows the securing surface 212b on the chassis securing member 212 to engage the securing surface 512bb on the securing beam 512b, as illustrated in FIG. 6g. While the card coupling apparatus 602a has been illustrated as a separate component that may be removeably coupled to the IHS chassis 500, in an embodiment, the first securing member 300, the second securing member 400, and/or the base member 200 may also be fabricated as an integral part of the IHS chassis 500.

Figure 6H:
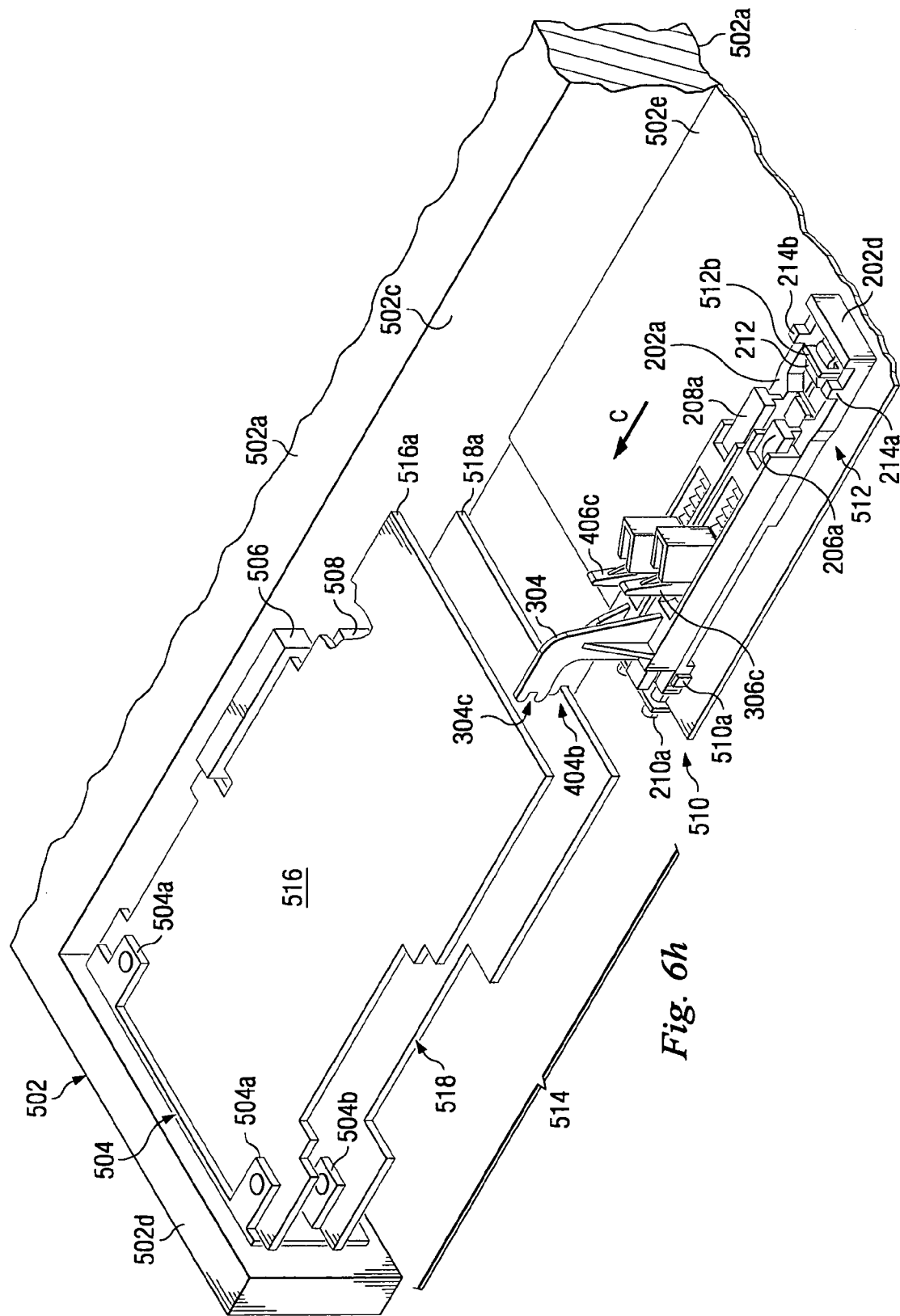
FIG. 6h is a perspective view illustrating an embodiment of the second securing member of FIG. 6g engaging a card on the IHS chassis of FIG. 5.
Figure 6I:
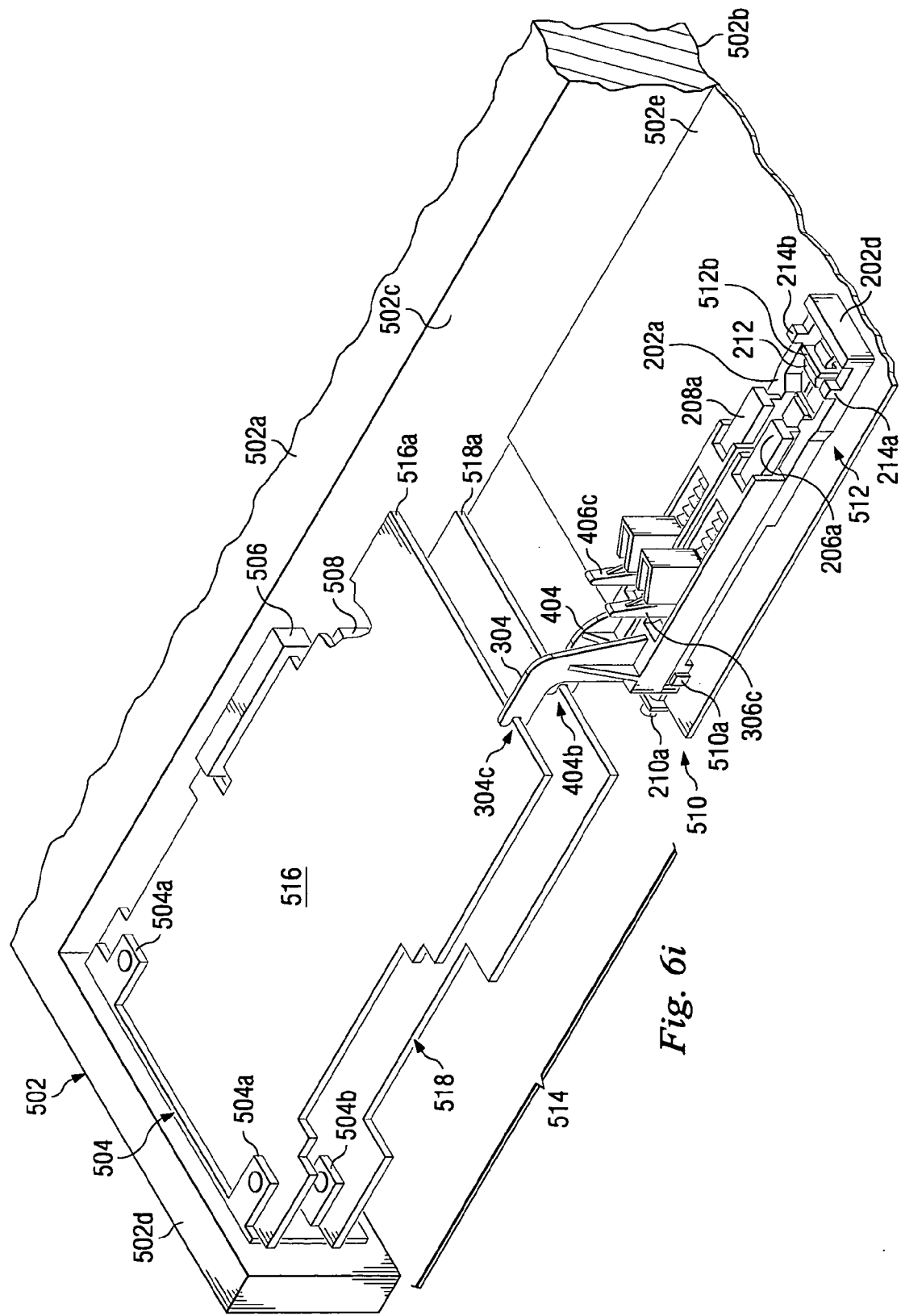
FIG. 6i is a perspective view illustrating an embodiment of the first securing member of FIG. 6g engaging a card on the IHS chassis of FIG. 5.
Figure 6J:
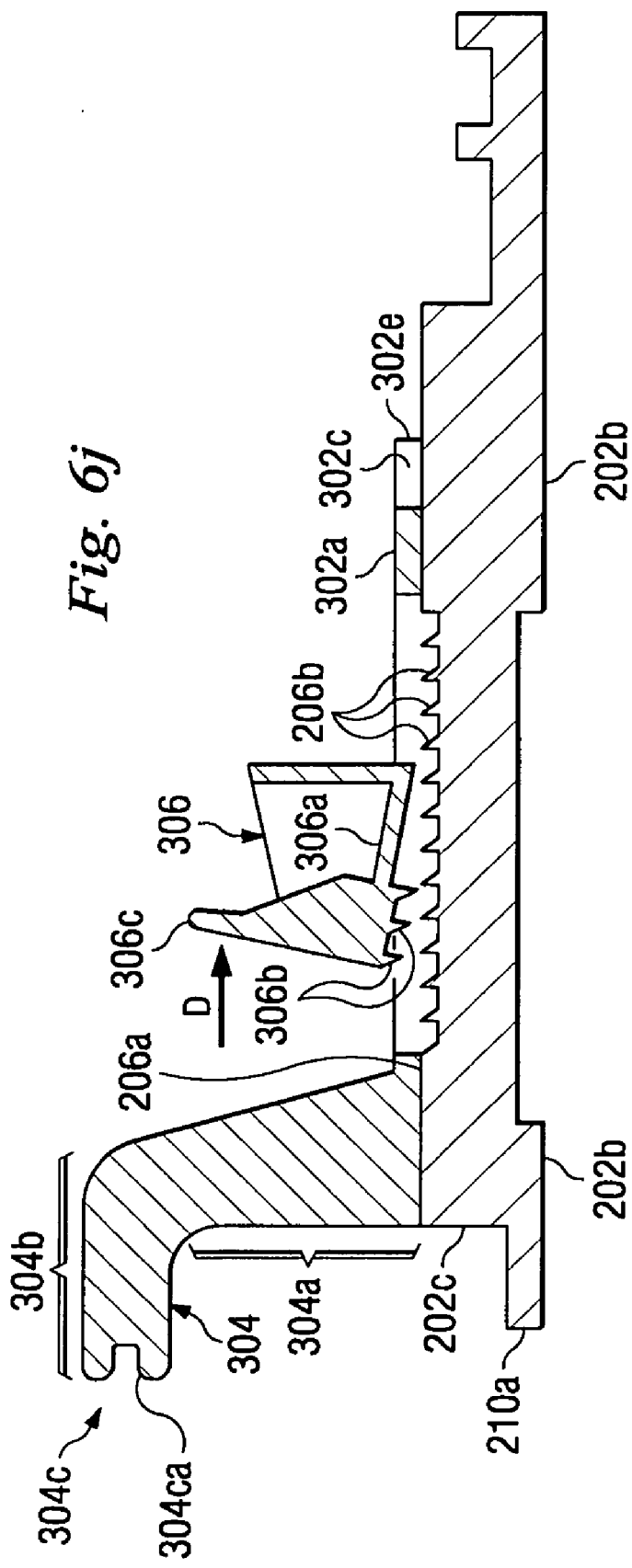
FIG. 6j is a cross sectional view illustrating an embodiment of the first securing member of FIG. 6g with the locking member disengaging the base member.

Referring now to FIGS. 6h, 6i, and 6j, the method 600 then proceeds to step 606, where the first card 516 and the second card 518 are supported with the first securing member 300 and the second securing member 400. The second securing member 400 is moved in a direction C such that the distal end 518a of the second card 518 is located in the engagement channel 404ba of the second securing member 400, as illustrated in FIG. 6h. Due to the design and engagement of the teeth 406b on the locking member 406 of second securing member 400 and the teeth 208b and 208c on the second track 208 of the base member 200, the second securing member 400 may move in the direction C but is restricted from moving in a direction opposite the direction C. The first securing member 300 is then also moved in the direction C such that the distal end 516a of the first card 516 is located in the engagement channel 304ca of the first securing member 300, as illustrated in FIG. 6i. Due to the design and engagement of the teeth 306b on the locking member 306 of first securing member 300 and the teeth 206b and 206c on the first track 206 of the base member 200, the first securing member 300 may move in the direction C but is restricted from moving in a direction opposite the direction C. In an embodiment, the first securing member 300 and the second securing member 400 can support a variety of different sized cards due to the adjustability of the first securing member 300 and the second securing member 400 provided by the engagement of the teeth 306a, 206b and 206c and the teeth 406c, 208b, and 208c. Thus, a method and apparatus are provided which allow a plurality of cards to be supported in an IHS such that the movement of the cards is restrained during shock and/or vibration of the IHS chassis. In order to release the first card 516 from the first securing member 300, a force D is applied to the handle 306c on the locking member 306 of the first securing member 300, deflecting the beam 306a such that the teeth 306b on the locking member 306 disengage the teeth 206b on the first track 206 and the first securing member 300 may be moved in a direction opposite the direction C. The second card 518 may be released from the second securing member 400 in substantially the same manner.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A card supporting apparatus, comprising:
   a base member;
   a first securing member moveably coupled to the base member, wherein the first securing member comprises a first card engagement feature located a first height above the base member, wherein the first securing member comprises a first locking member, whereby the first locking member engages the base member such that the first securing member is movable in a first direction but is restricted by the engagement of the first locking member and the base member from moving in a second direction that is opposite the first direction; and
   a second securing member moveably coupled to the base member, wherein the second securing member comprises a second card engagement feature located a second height above the base member, whereby the second height is different from the first height.

2. The apparatus of claim 1, wherein the base member comprises a first track and a second track, whereby the first securing member is moveably coupled to the first track and the second securing member is moveably coupled to the second track.

3. The apparatus of claim 1, wherein the first locking member comprises a handle for disengaging the first locking member from the base member.

4. A card supporting apparatus, comprising:
   a base member;
   a first securing member moveably coupled to the base member, wherein the first securing member comprises a first card engagement feature located a first height above the base member; and
   a second securing member moveably coupled to the base member, wherein the second securing member comprises a second card engagement feature located a second height above the base member, whereby the second height is different from the first height, wherein the second securing member comprises a second locking member, whereby the second locking member engages the base member such that the second securing member is movable in a first direction but is restricted by the engagement of the second locking member and the base member from moving in a second direction that is opposite the first direction.

5. The apparatus of claim 4, wherein the second locking member comprises a handle for disengaging the second locking member from the base member.

6. The apparatus of claim 4, wherein the base member comprises a chassis coupling feature operable to couple the base member to an information handling system chassis.

7. An information handling system (IHS), comprising:
   an IHS chassis comprising a securing member support surface;
   a first card coupling feature located in the IHS chassis;
   a second card coupling feature located in the IHS chassis adjacent the first card coupling feature;
   a first securing member moveably coupled to the IHS chassis, wherein the first securing member comprises a first card engagement feature located a first height above the securing member support surface and operable to engage a card coupled to the first card coupling feature, wherein the first securing member comprises a first locking member, whereby the first locking member allows the first securing member to move in a first direction but restricts the movement of the first locking member in a second direction that is opposite the first direction; and
   a second securing member moveably coupled to the IHS chassis, wherein the second securing member comprises a second card engagement feature located a second height above the securing member support surface and operable to engage a card coupled to the second card coupling feature, whereby the second height is different from the first height.

8. The system of claim 7, wherein the first locking member comprises a handle that is operable to allow the first locking member to move in the second direction.

9. An information handling system (IHS), comprising:
   an IHS chassis comprising a securing member support surface;
   a first card coupling feature located in the IHS chassis;
   a second card coupling feature located in the IHS chassis adjacent the first card coupling feature;
   a first securing member moveably coupled to the IHS chassis, wherein the first securing member comprises a first card engagement feature located a first height above the securing member support surface and operable to engage a card coupled to the first card coupling feature; and
   a second securing member moveably coupled to the IHS chassis, wherein the second securing member comprises a second card engagement feature located a second height above the securing member support surface and operable to engage a card coupled to the second card coupling feature, whereby the second height is different from the first height, wherein the second securing member comprises a second locking member, whereby the second locking member allows the second securing member to move in a first direction but restricts the movement of the second locking member in a second direction that is opposite the first direction.

10. The system of claim 9, wherein the second locking member comprises a handle that is operable to allow the second locking member to move in the second direction.

11. The system of claim 9, wherein the first securing member and the second securing member are moveably coupled to a base member that is removeably coupled to the securing member support surface.

12. The system of claim 9, further comprising:
a first card coupled to the first card coupling feature in the IHS chassis; and
a second card coupled to the second card coupling feature in the IHS chassis.

13. The system of claim 12, wherein the first card engagement feature engages the first card and second card engagement feature engages the second card.

14. The system of claim 12, wherein the first card is located in a substantially parallel and spaced apart relationship with the second card.

* * * * *